Sept. 28, 1954 A. J. ROGER 2,689,978
CLAMPING APPARATUS FOR INJECTION MOLDING MACHINE MOLDS
Filed Feb. 14, 1950 3 Sheets-Sheet 1

INVENTOR.
ALBERT J. ROGER
BY
Townsend, Townsend & Hoppe
ATTORNEYS

Sept. 28, 1954 A. J. ROGER 2,689,978
CLAMPING APPARATUS FOR INJECTION MOLDING MACHINE MOLDS
Filed Feb. 14, 1950 3 Sheets-Sheet 2
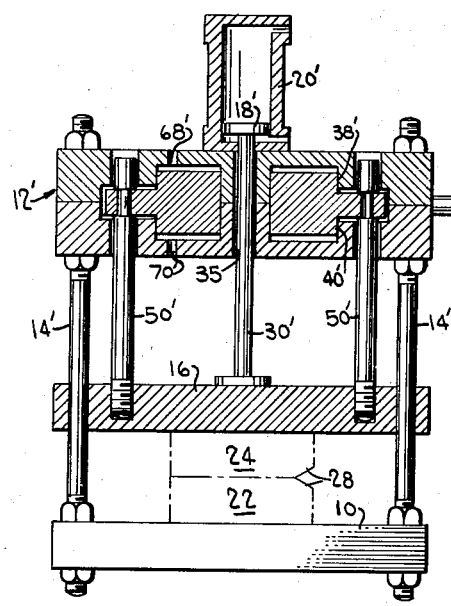
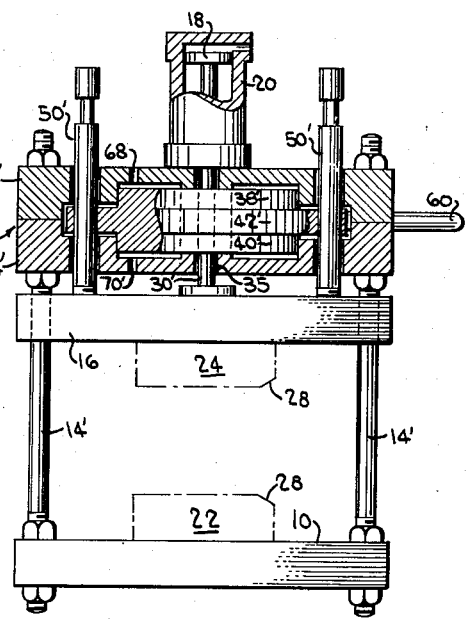
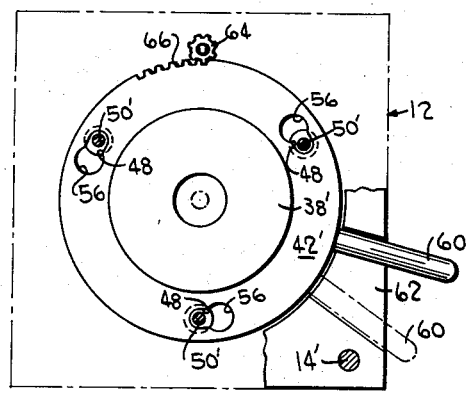
INVENTOR.
ALBERT J. ROGER
BY
Townsend, Townsend & Hoppe
ATTORNEYS Sept. 28, 1954        A. J. ROGER        2,689,978
CLAMPING APPARATUS FOR INJECTION MOLDING MACHINE MOLDS
Filed Feb. 14, 1950        3 Sheets-Sheet 3
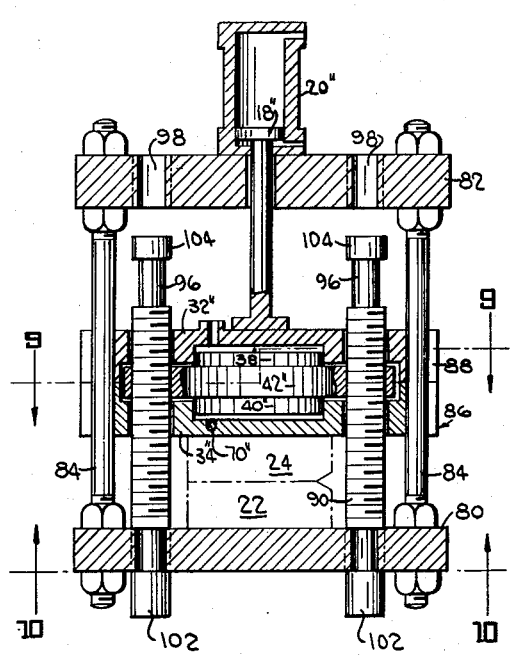
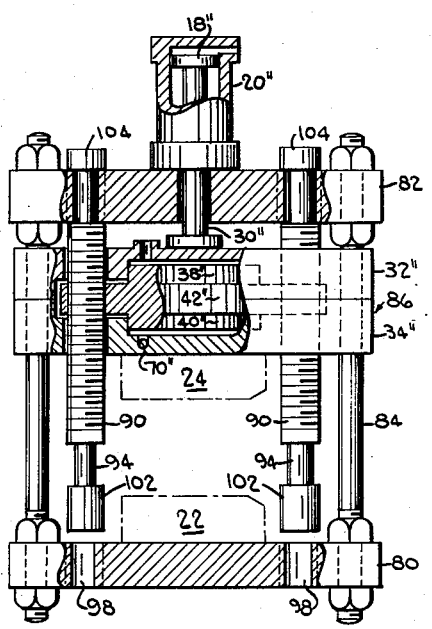
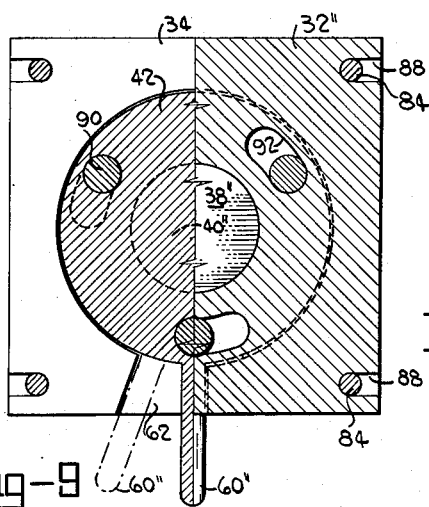
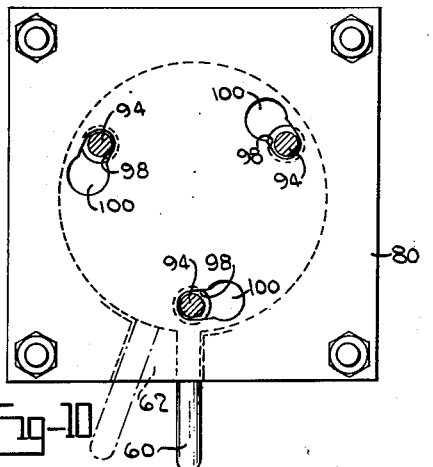
INVENTOR.
ALBERT J. ROGER
BY
Townsend, Townsend & Hoppe
ATTORNEYS Patented Sept. 28, 1954

2,689,978

UNITED STATES PATENT OFFICE 2,689,978

CLAMPING APPARATUS FOR INJECTION MOLDING MACHINE MOLDS

Albert J. Roger, Oakland, Calif.

Application February 14, 1950, Serial No. 144,143

20 Claims. (Cl. 18—30)

1

This application is a continuation in part of my prior filed application, Ser. No. 118,780, filed Sept. 30, 1949, and Ser. No. 133,877, filed Dec. 19, 1949, which applications are hereby made a part hereof.

The applications above referred to describe and claim, respectively, clamps which permit the use of molds having very large areas at the parting plane, and molds which have such areas and also have great depth. The former molds require enormous clamping pressures in order to prevent flashing during injection, and the latter molds require, in addition to the large clamping force, enormous pulling forces to separate the parts of the mold from each other and one part of the mold from the molding.

It is one of the objects of the present invention to provide in a clamp having a double acting clamping piston and cylinder, and having a double acting elevating or traversing piston and cylinder, an arrangement such that injection may be provided for, either axially through one platen or laterally at the parting plane.

It is a further object of this invention to provide such an arrangement in which strain rods and push-pull rods have minimum lengths with respect to the mold depth.

It is another object of the invention to provide in such an arrangement for the removal from the usual strain rods, of the mold clamping and mold separating thrusts.

It is still another object of the invention to provide in such an arrangement, particularly as employed in vertical clamps, for the locking of the movable mold part in a mold open position.

Other objects and advantages will appear in the following specification and accompanying drawings, in which:

Fig. 4 is a vertical sectional view of a second embodiment of the invention showing the clamping parts in closed position.

Fig. 5 is a vertical sectional view of a second embodiment of the invention showing the clamping parts in open position.

Fig. 6 is a top plan view of the structure shown in Fig. 4 with a major portion of the upper header plate broken away.

2

Fig. 7 is a vertical sectional view of a third embodiment of the invention showing the clamping parts in closed position.

Fig. 8 is a vertical sectional view of a third embodiment of the invention showing the clamping parts in open position.

Fig. 9 is a sectional view taken substantially on line 9—9 of Fig. 7.

Fig. 10 is a sectional view taken on line 10—10 of Fig. 7 but showing the frame bolts and nuts in full lines.

Figure 1:
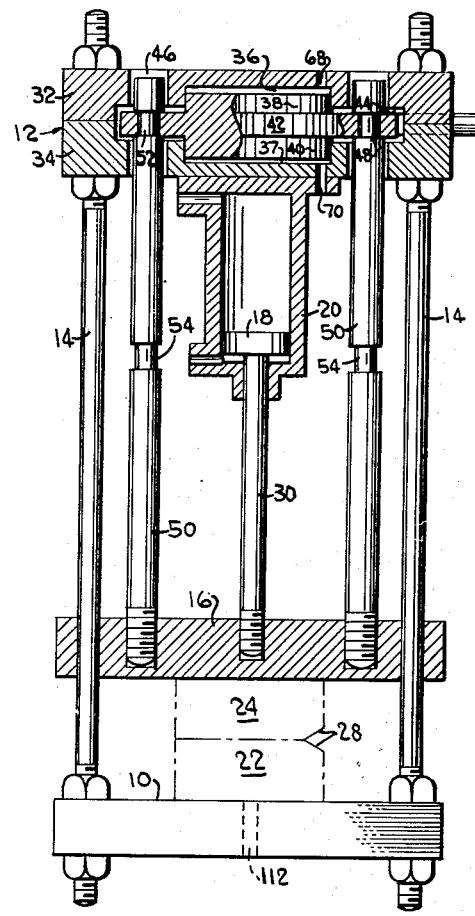
Fig. 1 is a vertical sectional view of one embodiment of the invention showing the clamping parts in closed position.
Figure 2:
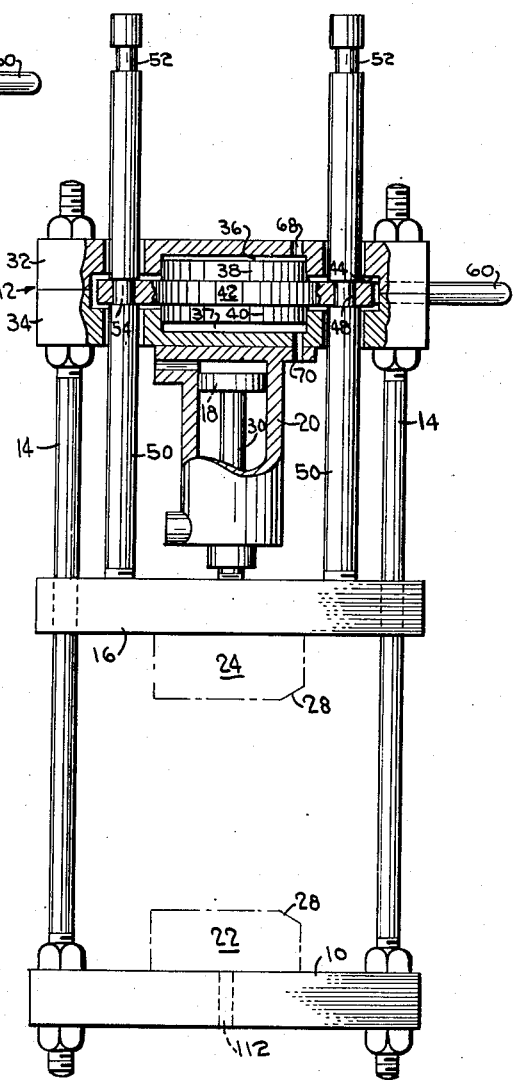
Fig. 2 is a vertical sectional view of one embodiment of the invention showing the clamping parts in open position.
Figure 3:
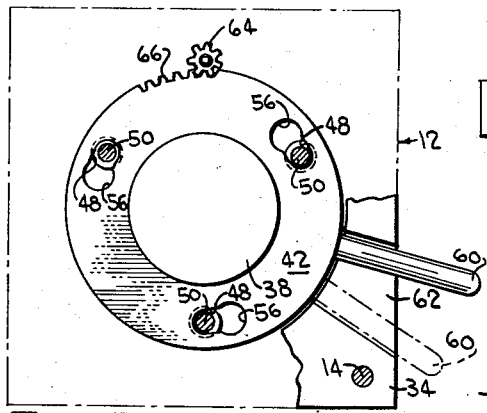
Fig. 3 is a top plan view of the structure shown in Fig. 1 with the major portion of plate 32 broken away.

Referring now to Figs. 1, 2 and 3, the clamp is illustrated as embodying a bottom platen 10, a header 12, strain rods 14, moving platen 16, traverse piston 18 and traverse piston cylinder 20, stationary mold part 22 secured to platen 10 and moving mold part 24 secured to moving platen 16. The usual sprue fittings are provided on the mold parts for injection at the parting plane as is usual in vertical clamp arrangements. Axial sprue fitting may be applied as at 112 in Fig. 1, to all the modifications herein described. The traverse piston 18 and cylinder 20 are mounted on the bottom of the header 12 between the header and the stationary platen 10. The piston 18 is joined to the movable platen 16 by a connecting rod 30, the cylinder 20 and rod 30 being of approximately the same length. The space between mold parts 22 and 24 is, therefore, equal approximately to one half the distance from the bottom of platen 16 to the bottom of header 12.

The header 12 is formed of two thick plates 32 and 34 each providing a cylindrical recess 36 in which are received the two ends 38 and 40 of a double acting piston having an annular ring portion 42 received in the space formed by annular recesses 44 in plates 32 and 34. Spaced at one hundred and twenty degree intervals in a circle about the axis of piston 18 are passages 46 through the two plates. The annular ring 42 is provided with openings 48 also at 120° intervals in a circle about the axis of piston 18 having the same diameter as the circle for passages 46.

Three push-pull rods 50 are secured to platen 16, parallel to piston rod 30 in alignment with passages 46. Rods 50 are provided with reduced portions 52 and 54 forming latching shoulders or latching notches. The ring openings 48 provide an enlarged portion 56 for passage of the rod 50 therethrough and a reduced arcuate slot 58 for receiving, by rotation of the piston and ring 42, the reduced portions 52 and 54 of the push-pull rods when the notches are in registry therewith. Suitable means, such as handles 60 attached to ring portion 42 and extending through slots 62, or a pinion gear 64 driving teeth 66 on the ring, serve to rotate the ring and piston for positioning openings 48 as required. While mold 24 is traversed or elevated by piston 18, the large openings 56 are in registry with rods 50 and permit quick movement. When the platen 16 is in mold-closed position the rods 50 serve as equalizing piston rods and the faces of molds 22 and 24 are pressed together with a uniform pressure over their surfaces. This is due to the fact that pistons 38 and 40 are of large diameter and have short cylindrical surfaces which are so fitted with the cylinder walls that the pistons can tilt their axes with respect to the cylinder axis sufficiently to transmit equal forces into the three rods 50.

In the closed position as indicated in Fig. 1, clamping pressure is exerted through inlet 68 on piston 38, thence the clamping thrust is transmitted through rods 50 to platen 16. Only a few thousandths of an inch of movement is required of piston 38, this movement being necessary to compensate for looseness, stretches of the rods 14, and compressions of rods 50. During injection the pressure at 68 is maintained by a pressure regulator at a value above that caused by the injection ram tending to separate the mold parts. This opening thrust due to the ram stretches rods 14, and piston 38 is moved downwardly, thus taking up the stretch and preventing flash by holding the interfaces of mold parts 22 and 24 in tight contact.

After the molding has been completed, the mold parts are separable by applying adequate pressure at inlet 70 to act on piston 42. This pulls rods 50 upwardly a few thousandths of an inch with a very high pulling force, and separates the mold parts, thus facilitating removal of the molding which may be effected by well known stripping devices after the mold parts have been loosened of each other. When the platen is to be drawn to its fully retracted position as seen at the right in Fig. 1, the handle 60 is rotated to clear rods 50. Piston 18 is then traversed and when rods 50 reach their uppermost positions the handle 60 may again be rotated to effect the latching of platen 16 in the out of the way position.

It will be appreciated that the cylinder 20 and piston 18 need be of only small diameter since the work done in moving platen 16 is quite small and a high speed may be accomplished with a reasonable unit pressure of working fluid. Therefore only a small amount of hydraulic fluid is required for operating piston 18, and the speed of its operation is accordingly high with a pump of small displacement rate. In this way a long stroke with little volume displacement is attained and deep molds are accommodated.

In the modification shown in Figs. 4, 5 and 6 the header 12' provides a ring shaped cylinder for receiving the ring shaped integral pistons 38' and 40'. The core 35 of the cylinders provided a passage for a piston rod 30' and cylinder 20' is fastened to the top of the header 12' with piston 18' therein. This arrangement reduces the lengths of rods 14' and 50' over rods 14 and 50 in Figs. 1 and 2. The construction is, otherwise, similar to that of Figs. 1 and 2.

The clamp of Figs. 7-10 inclusive comprises a stationary platen 80, a header 82, parallel supporting strain and guide rods 84 rigidly securing the platen 80 to header 82. A movable platen and clamping assembly 86 slides on rods 84 and carries the movable mold 24. The assembly is elevated and lowered by piston 18" to which assembly 86 is attached by piston rod 30". The plates 32" and 34" are similar to the plates 32 and 34 of Fig. 1, except that they are notched at 88 for guidance on rods 84. The integral double piston 38" and 40" and annular ring 42" are similar to that in Fig. 1.

The push-pull rods 90 are threaded through the ring 42 and extend through arcuate passages 92 in plates 32 and 34. The rods 90 are provided with notches 94 and 96. The platen 80 and header 82 are provided with openings 98 having enlarged portions 100 for passage of the heads 102 and 104 of the push-pull rods, and reduced portions 98 for receiving the notches 94 of the push-pull rods.

The double acting piston is rotatable by means of a handle 60" when the mold is fully closed or fully open, and when so rotated the notches 94 and 96 rotate into the latched position as seen in Fig. 9. It will be observed that when the mold is closed and the notch 94 is engaged with platen 80 as seen in Fig. 7, when fluid pressure is admitted beneath piston 40" through inlet 70", clamping pressure is exerted on the mold parts which clamping pressure is not transmitted to the strain rods 84. The rods 84 need not, therefore, be made of a cross section to withstand the enormous clamping forces often used. It will also be noted that no shifting of the stationary platen results from these clamping pressures. The same benefits accrue in the mold separation operation.

It will be noted that the rods 90 may, by their threading, be both adjusted to the mold depth, and adjusted upwardly through the ring 42" so that the heads 102 substantially clear the mold space for more ready access of an operator thereto.

The illustration of Fig. 9 shows the various positions of rods 90 with respect to the passages 98 when the handle 60" is operated to permit elevation and lowering of the assembly 86.

I claim:

1. A mold clamp for injection molds comprising, in combination: a stationary platen, strain rods rigidly secured thereto and extending in parallel therefrom at one side thereof, a header rigidly mounted on the strain rods at a distance from the stationary platen to form a working space between the platen and the header; a traversing motor comprising two relatively movable motor parts and one of said traversing motor parts being mounted rigidly with the header, a movable platen mounted for sliding on the strain rods between the header and the stationary platen, a connecting rod joining the movable platen to the movable one of the traversing motor parts; and means including a high thrust fluid pressure motive assembly having relatively movable motive parts providing two like fluid pressure motors constructed and arranged to both produce motor actions parallel to the strain rods and respectively in opposite directions and both motors being of like and substantially greater thrusts and of substantially shorter strokes than the thrusts and strokes of the traversing motor, means for connecting the high thrust fluid pressure motive assembly to the movable platen and to the stationary platen to enable the assembly to alternatively exert clamping forces and mold separating forces on the mold parts when connected to the platens, and means for rendering the connecting means ineffective during operation of the traversing motor.

2. A mold clamp as set forth in claim 1, said connecting means comprising thrust members carried with the movable platen constructed and arranged to extend between the header and the movable platen.

3. A mold clamp as set forth in claim 1, said high thrust fluid pressure motive assembly motors having substantially equal fluid pressure responsive areas.

4. A mold clamp as set forth in claim 1, said one part of said traversing motor being mounted outside said header from said space, and said connecting rod extending from said other part of said motor through said header to said platen.

5. A mold clamp as set forth in claim 1, said high thrust pressure motive assembly being arranged on and comprised partly of said header.

6. A mold clamp as set forth in claim 4, said high thrust pressure motive assembly being arranged on and comprised partly of said header.

7. A mold clamp as set forth in claim 1, said high thrust pressure motive assembly being arranged on and comprised partly of said movable platen.

8. A mold clamp as set forth in claim 4, said high thrust pressure motive assembly being arranged on and comprised partly of said movable platen.

9. A mold clamp as set forth in claim 1, said two like fluid pressure motors including integral coaxial pistons and coaxial cylinders of circular cross sections transverse their axes of reciprocation, said pistons being rotatable about their axes and having means extending radially therefrom between the cylinders constituting part of said platen and motive assembly connecting means.

10. A mold clamp as set forth in claim 9, said one part of said traversing motor being mounted outside said header from said space, said pistons and cylinder spaces being of ring shape providing a cylindric core surrounded by said ring pistons, and said cylindric core being provided with an axial passage therethrough; and said connecting rod extending from said other part of said traversing motor through said header to said platen.

11. A high thrust fluid pressure motive assembly according to claim 9, and means for rotating said pistons about their axes constituting a part of said platen and motive assembly connecting means.

12. A mold clamp as set forth in claim 11, said platen and motive assembly connecting means comprising straight rods extending parallel to the axis of the pistons and having notched parts and means responsive to relative rotation of said pistons and said rods to form a rigid link from the header to the platen for said pistons to extend their thrusts through the rods between the platens and the pistons.

13. In a machine, in combination: two force members to be pressed toward and drawn away from each other; two relatively movable inflexibly rigid motive assemblies constituting a traversing motor, and each rigid assembly being rigidly and inflexibly connected to one of said two force members, for relatively and positively moving said two force members through a substantial distance alternatively in either of two directions; and high thrust means for relatively moving said two force members through a distance only very small as compared to such substantial distance independently of said traversing motor, said high thrust means comprising reversibly actuatable fluid pressure actuated motive driving devices providing two relatively movable elements having large fluid thrusting areas normal to the directions of movements of said force members and each area being juxtaposed to the like area of the other and providing short relative movements normal to said areas coextensive to the required small distance, said high thrust means further comprising relatively movable high thrust force transmitting components and also comprising parts supporting said high thrust force transmitting components respectively by, and for like relative movements with and by, each of the traversing motor assemblies in their relative traversing movements; and said high thrust means further comprising selective mechanism for rigidly interconnecting, and for disconnecting, said high force transmitting components to and from said force members for transmitting the high thrust forces of said fluid pressure actuated means and for alternatively allowing relative movements of said transmitting components by said traversing motor.

14. A machine as set forth in claim 13, said force transmitting components comprising a plurality of rods having a length substantially equal to the distance of relative movement of said traversing motor assemblies.

15. A machine as set forth in claim 14, there being three such rods equiangularly spaced around and parallel to the axis of movement of said traversing motor.

16. A machine as set forth in claim 13, said motor and high thrust means being constructed and arranged for resolving the centers of their respective forcing actions on and along a common straight axis.

17. A machine as set forth in claim 13, the motive driving devices of said high thrust means being entirely supported and guided by one rigid assembly of the traversing motor.

18. A machine as set forth in claim 17, and the supporting means of one of said force transmitting components being mounted on one of said elements and for movement thereby relative to the other element.

19. A machine as set forth in claim 13, said high thrust fluid pressure actuated motive driving devices constituting a double acting motor.

20. A machine as set forth in claim 17, said high thrust fluid pressure actuated motive driving devices constituting a double acting motor.

References Cited in the file of this patent

UNITED STATES PATENTS

| Number | Name | Date |
| --- | --- | --- |
| 1,466,490 | Swanson | Aug. 28, 1923 |
| 1,922,937 | Eckert | Aug. 15, 1933 |
| 1,952,241 | Eckert | Mar. 27, 1934 |
| 2,268,949 | Lehmann | Jan. 6, 1942 |
| 2,355,613 | Wacker | Aug. 15, 1944 |
| 2,356,634 | Von Opel | Aug. 22, 1944 |
| 2,410,909 | Tucker | Nov. 12, 1946 |
| 2,564,885 | De Sternberg | Aug. 21, 1951 |